E. D. FOSS.
Evaporating Pan.
No. 34,484.
Patented Feb. 25, 1862.
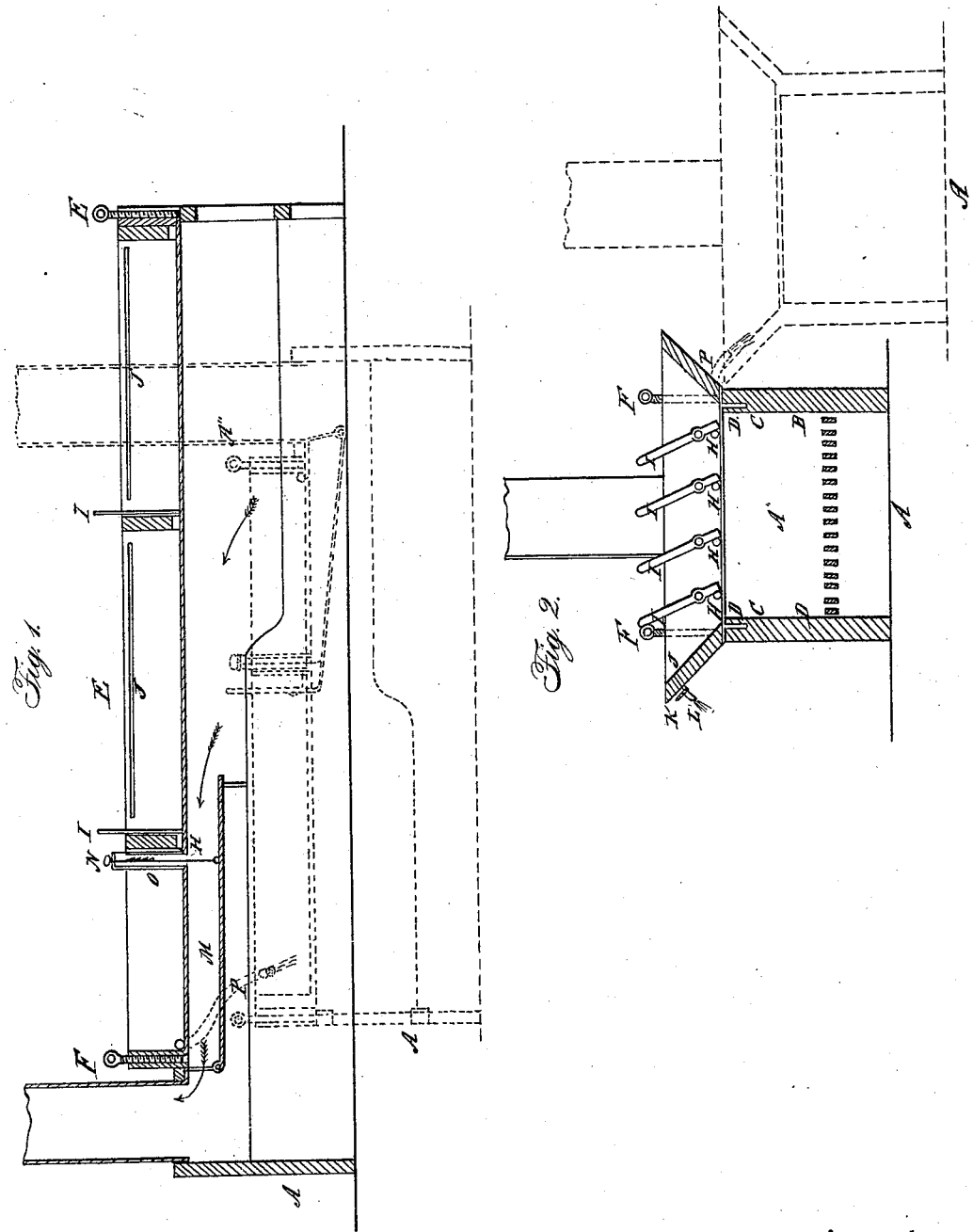
Witnesses:
Patrick Gilligan
William Eaton
Inventor:
E. D. Foss
Knight Bros
Attys

UNITED STATES PATENT OFFICE.

EPHRAIM D. FOSS, OF MAINEVILLE, OHIO.

IMPROVED EVAPORATING-PANS FOR SACCHARINE JUICES.

Specification forming part of Letters Patent No. 34,484, dated February 25, 1862.

*To all whom it may concern:*

Be it known that I, EPHRAIM D. FOSS, of Maineville, Warren county, Ohio, have invented new and useful Improvements in Saccharine Evaporators, of which the following is a full, clear, and exact description, reference being had to the annexed drawings, making part of this specification.

My invention relates to provisions for the uniform inspissation of the juice of the sorghum and other saccharine plants without scorching or discoloration.

Figure 1 is a longitudinal section. Fig. 2 is a transverse section.

A A' are two batteries of similar construction, but upon different levels.

A'' is a long low furnace, of masonry or iron, whose side walls, B, have in their upper edges deep grooves or channels C, to receive vertical longitudinal flanges D, which project from the bottom of the pan E. Four set-screws, F, passing downward through the four corners of the pan, and resting upon the furnace-walls, enable the trimming of the pan, so as to preserve its exact transverse level, and they also enable a slight elevation of the receiving end when it is desired to expedite the flow of the liquor, and vice versa. The flanges D, while permitting such adjustment, prevent a leakage of cold air into the furnace incident to the elevation of the pan or to the settling of the furnace-walls. The joint formed by the grooves C and flanges D may be luted by sand or clay, if desired. A number of transverse partitions, G, divide the pan E into compartments $e\ e'\ e''$, which communicate with each other by a series of small equidistant ducts, H, near the bottom of each partition. These ducts are closable separately or simultaneously by means of gates I.

By the represented arrangement of a series of small equidistant ducts at the bottom of each partition, I obtain an equable flow of liquor, extending all across the pan and free from eddies.

M is a draft-plate, which, in the position shown, compels the fire to hug the bottom of the last boiling-pan $e''$, or which, being elevated by handle N, directs the fire more or less away from the said pan $e''$, and at the same time permits cool air to descend the tube O through the hottest part of the sirup, and to mingle with and cool the heated gases beneath the compartment $e''$. The first compartment and one or more of those next in succession have each a long narrow horizontal sluice or ventage, J, near the top of one or both sides, into which the scum, being from time to time swept by the operator, escapes by trough K and spout L. For convenience of illustration, but three compartments or pans are shown; but in practice any desired number may be employed. A pipe, P, conducts the liquor from the last or coolest compartment $e'''$ of the first battery to the first or hottest compartment of the second battery, (see blue lines A',) which compartment should be somewhat cooler than said compartment $e'''$, and should be sufficiently below it for the flow of liquor from said compartment.

I claim herein as new and of my invention and desire to secure by Letters Patent—

1. The series of small equidistant apertures H, when used in the described combination with separate lever-gates I I I, and all constructed and arranged in the manner and for the purposes herein shown and explained.

2. The arrangement of draft-board M, rod N, and tube O in the described combination with the last evaporating pan or compartment, for the purpose of modulating the heat thereto, as therein explained.

3. The provision of surface-sluices J, constructed as described, for the easy discharge of scum in the manner described.

4. The combination of the two batteries A and A', placed side by side, one higher than the other, when in other respects constructed and arranged in the manner herein shown and described, and for the objects stated.

In testimony of which invention I hereunto set my hand.

E. D. FOSS.

Witnesses:
GEO. H. KNIGHT,
WM. EATON.